United States Patent
Lautenbach et al.

(10) Patent No.: US 7,976,586 B2
(45) Date of Patent: *Jul. 12, 2011

(54) 1-PHENOXY-2-PROPANOL AS A FORMULATING AID FOR DYES

(75) Inventors: Holger Lautenbach, Rheinfelden (DE); Adolf Käser, Bottmingen (CH)

(73) Assignee: BASF SE, Ludwigshafen (DE)

( * ) Notice: Subject to any disclaimer, the term of this patent is extended or adjusted under 35 U.S.C. 154(b) by 343 days.

This patent is subject to a terminal disclaimer.

(21) Appl. No.: 11/919,102

(22) PCT Filed: May 8, 2006

(86) PCT No.: PCT/EP2006/062107
§ 371 (c)(1), (2), (4) Date: Oct. 23, 2007

(87) PCT Pub. No.: WO2006/122887
PCT Pub. Date: Nov. 23, 2006

(65) Prior Publication Data
US 2008/0307588 A1    Dec. 18, 2008

(30) Foreign Application Priority Data
May 18, 2005 (EP) .................................. 05104146

(51) Int. Cl.
  D06P 1/90 (2006.01)
  C09B 67/24 (2006.01)
  C09B 67/32 (2006.01)

(52) U.S. Cl. ............ 8/613; 8/550; 8/611; 8/619; 8/657; 8/658

(58) Field of Classification Search .................. 8/115.51
See application file for complete search history.

(56) References Cited

U.S. PATENT DOCUMENTS

| | | | |
|---|---|---|---|
| 2,283,823 A | 5/1942 | Sieglitz et al. | |
| 4,478,681 A | 10/1984 | Müller et al. | |
| 4,995,885 A | 2/1991 | Morawietz | |
| 5,143,519 A | 9/1992 | Stingelin | |
| 5,173,086 A | 12/1992 | Bermes | |
| 5,295,999 A | 3/1994 | Hinrichs et al. | |
| 5,378,818 A | 1/1995 | Mayer et al. | |
| 6,248,314 B1 | 6/2001 | Nakashimada et al. | ... 424/70.11 |
| 6,521,032 B1 | 2/2003 | Lehmann et al. | ......... 106/31.51 |
| 6,576,025 B2 * | 6/2003 | Lapierre | ........................ 8/485 |
| 2002/0007524 A1 | 1/2002 | Sorensen | |
| 2002/0139957 A1 * | 10/2002 | Matsuo et al. | ............ 252/186.1 |
| 2003/0208856 A1 * | 11/2003 | Miyabe et al. | ................... 8/405 |
| 2004/0049860 A1 | 3/2004 | Cottard et al. | |
| 2005/0071932 A1 | 4/2005 | Lautenbach et al. | |
| 2006/0053569 A1 | 3/2006 | Radisson et al. | |

FOREIGN PATENT DOCUMENTS

| | | |
|---|---|---|
| CH | 503 091 | 3/1971 |
| CH | 503091 | 3/1971 |
| EP | 0 369 940 | 5/1990 |
| EP | 0 451 092 | 10/1991 |
| EP | 0 479 056 | 4/1992 |
| EP | 0 553 672 | 8/1993 |
| EP | 0 601 401 | 6/1994 |
| EP | 1086999 | 3/2001 |
| EP | 1 235 881 | 2/2004 |
| GB | 1 333 937 | 10/1973 |
| GB | 1333937 | 10/1973 |
| JP | 04/122933 | 9/1990 |
| JP | 2000/229820 | 8/2000 |
| WO | 01/68042 | 9/2001 |
| WO | 03/064539 | 8/2003 |

OTHER PUBLICATIONS

Copending U.S. Appl. No. 11/919,103 to Lautenbach et al.*
Patent Abstracts of Japan for 2000/229820, Copyright 2000, JPO.
Patent Abstracts of Japan for JP 04/122933, Copyright 1992, JPO.
USPTO, Office Action dated Dec. 16, 2009 for U.S. Appl. No. 11/919,103 filed on Oct. 23, 2007.
USPTO, Office Action dated Jun. 10, 2010 for U.S. Appl. No. 11/919,103 filed on Oct. 23, 2007.

* cited by examiner

*Primary Examiner* — Harold Y Pyon
*Assistant Examiner* — Katie Hammer
(74) *Attorney, Agent, or Firm* — Shiela A. Loggins

(57) ABSTRACT

The invention relates to an aqueous dye solution comprising a) 5 to 30% by weight of an anionic or cationic direct dye, b) 0.1 to 10% by weight of 1-phenoxy-2-propanol, c) 0 to 20% by weight of an inorganic or an organic acid, d) 0 to 20% by weight of further additives and e) water to complete to 100%, a process for the preparation of the solution and the use thereof for dyeing paper.

11 Claims, No Drawings

1-PHENOXY-2-PROPANOL AS A FORMULATING AID FOR DYES

The instant invention relates to storage stable, concentrated aqueous solutions of direct dyes, both anionic dyes and cationic or basic dyes, a process for their preparation and the use thereof for dyeing paper.

In recent years, the use of concentrated aqueous solutions of dyes has gained importance, especially for the dyeing of paper, due to the advantages possessed by such solutions when compared with dyes in powder form. Thus, for example, the use of solutions avoids the difficulties associated with dust formation and releases the user from the time-consuming and frequently difficult dissolving of the dye powder in water. The use of concentrated solutions was also prompted by the development of continuous dyeing processes, since it is convenient in these processes to meter the solution directly into the pulp stream or to add it at some other suitable point during the papermaking process. However, such solutions should be ecologically and toxicologically acceptable, stable on storage, also in concentrated form and be readily pumpable, even at relatively low temperatures.

A recent attempt to solve this problem has been disclosed in EP 1,235,881 B1, whereby it was found that concentrated aqueous solutions of water soluble anionic dyes could be obtained by addition of up to 4% of benzyl alcohol, which solutions are both stable to storage, although the exact definitions of storage stability are not disclosed, and also exhibit desirable flow properties, although again no numerical data are divulged. Furthermore, this document also summarizes the various previous attempts to provide storage stable aqueous dye solutions by addition of, for example, urea, urea/N-methylprrolidone/benzyl alcohol mixtures, alcohols, including glycols and glycol ethers and further organic solvents, as well as the drawbacks in the use thereof.

Although benzyl alcohol would appear to be the additive of choice for the preparation of storage stable aqueous formulations of anionic dyes, one clear disadvantage is the undesirable odor of benzyl alcohol, even if utilized in relatively small quantities.

Surprisingly, it has now been found that the use of 1-phenoxy-2-propanol as a formulating aid provides odorless formulations of both anionic and cationic direct dyes which are stable to storage over long periods and which are superior in their flow properties to those formulations disclosed in the prior art, containing benzyl alcohol.

Consequently, the invention relates to an aqueous dye solution comprising
 a) 5 to 30%, preferably 10 to 25%, by weight of an anionic or cationic direct dye,
 b) 0.1 to 10%, preferably 0.5 to 5% and, most preferably, 0.5 to 3% by weight of 1-phenoxy-2-propanol,
 c) 0 to 20% by weight of an inorganic or an organic acid,
 d) 0 to 20% by weight of further additives and
 e) water to complete to 100%.

Where the solutions of the invention are solutions of anionic dyes, these direct dyes are preferably selected from dyes containing at least one sulfonic acid and/or carboxylic acid group and are derived from the following dye classes: metal-free or metallic monoazo, disazo and polyazo dyes, pyrazolone, thioxanthone, oxazine, stilbene, formazan, anthraquinone, nitro, methine, triphenylmethane, xanthone, naphthazarine, styryl, azastyryl, naphthoperinone, quinophthalone, and phthalocyanine dyes.

Typical examples of anionic direct dyes are listed in the Colour Index International, Fourth Edition Online (url: http://www.colour-index.org) and may be selected from C.I. Direct Yellows 1-177, C.I. Direct Oranges 1-122, C.I. Direct Reds 1-277, C.I. Direct Violets 1-108 and C.I. Direct Blues 1-313.

Where the solutions of the invention are solutions of cationic dyes, these cationic direct dyes are basic dyes. These so-called basic dyes are selected from the following classes: acridine, anthraquinone, azine, azomethine, azostyryl, mono-, bis- and polyazo, benzimidazole, benzothiazole, cyanine, di- and triarylmethane, ketone imine, methane and polymethine, naphthostyryl, nitro, oxazine and dioxazine, phthalocyanine, quinoline, quinophthalone, thiazine, thiazole and xanthene derivatives.

Typical examples of cationic direct dyes are listed in the Colour Index International, Fourth Edition Online (url: http://www.colour-index.org) and may be selected from C.I. Basic Yellows 1-108, C.I. Basic Oranges 1-69, C.I. Basic Reds 1-118, C.I. Basic Violets 1-51 and C.I. Basic Blues 1-164.

The invention is especially useful for solutions of specific dyes, such as C.I. Basic Yellow 99 and 106, C.I. Basic Red 111, C.I. Basic Blue 100 and 153, C.I. Direct Yellow 11, 50 and 84, C.I. Direct Orange 29 and 102, C.I. Direct Red 23, 80, 81, 239, 254 and 262, C.I. Direct Violet 9, 35 and 51 and C.I. Direct Blue 75, 86, 87, 199, 290 and 301.

Where the composition of the invention contains an organic or inorganic acid, those acids particularly suited may be selected from, for example, hydrochloric acid, sulphuric acid, phosphoric acid, formic acid, acetic acid, propionic acid, glycolic acid, gluconic acid, methanesulphonic acid, citric acid, succinic acid, lactic acid, glutamic acid, adipic acid or mandelic acid. Any of these acids may be used alone or in an acid mixture, although formic acid is most preferred.

Although the addition of an acid to the composition of the invention is optional, preferably the acid is present in an amount of between 1 and 20% by weight, most preferably between 1 and 5%, based on the total weight of the composition.

The dye solutions according to the invention may, in addition, contain further additives as component d), such as water-soluble organic solubilizers, examples of which are urea, formamide, ε-caprolactam, sugars, such as dextrine, maltose or lactose, carboxycelluloses, such as xanthan, dimethylformamide, 1,2-diaminopropane, 2-(4-aminophenyl)-6-methylbenzothiazole 7-sulphonic acid and salts thereof and polyhydric alcohols such as ethylene glycol or glycerol, ε-caprolactam and 2-(4-aminophenyl)-6-methylbenzothiazole 7-sulphonic acid and salts thereof being preferred. Further additives which may be present in the solutions of the invention are, for example, hydrotropic agents, viscosity regulators, dispersing agents, microbicides, particularly fungicides, and pH adjusting agents.

As pH adjusting agents, it is possible to use acids, bases or buffers which are conventional and are usually used for the pH adjustment of dye formulations, for example mineral acids, such as hydrochloric acid, sulphuric acid or phosphoric acid, low molecular weight aliphatic carboxylic acids, for example having from 1 to 6 carbon atoms, such as formic acid, acetic acid, lactic acid or citric acid, or bases, such as alkali metal hydroxides or carbonates, or also aliphatic low molecular weight amines, such as those which can be used for the corresponding salt formation of the above mentioned acid groups, for example, ammonia, diethanolamine, triethanolamine or N-methyidiethanolamine. As buffers, it is possible to employ, for example, mono- or disodium phosphate, sodium acetate or ammonium sulphate.

The pH of the concentrated dye solutions can thus be adjusted as required, depending upon the particular dye in question. Preferably, however, the pH of the solutions generally lies within the range of from 3 to 11, whereby, in the case of cationic dyes, a range of from 4 to 6 is preferred, whilst, in the case of anionic dyes, a pH value of between 6 and 8 is preferable.

Preferably, the aqueous solutions also contain known products as are usually employed for protection against the harmful effect of microorganisms, principally products which inhibit the growth of microorganisms or also microbicides, particularly fungicides. These may be employed in low concentrations, for example, in the range of from 0.01 to 1%, especially from 0.05 to 0.5%.

Although the addition of such additives to the composition of the invention is optional, preferably they are present in an amount of between 1 and 20% by weight, most preferably between 1 and 10%, based on the total weight of the composition.

Apart from small quantities of impurities, which may result from the dye synthesis, and salts, the solutions of the invention are preferably, essentially free from other solvents, in particular alcohols, other than 1-phenoxy-2-propanol.

In one further aspect, the invention relates to a process for the preparation of a dye solution, which process comprises stirring the dye with a mixture of water, 1-phenoxy-2-propanol and, if desired, components c) and d), as described above, at a temperature between room temperature and 90° C., preferably between 30 and 60° C. and, if necessary, filtering. The dyes can be employed in the form of corresponding dry dyes, as occur in blended commercial forms, or, preferably, as moist or also dried filter cakes or also as solutions which have previously been subjected to purification by micro- or ultra filtration.

Preferably, the anionic dyes are present in the form of readily water-soluble salts. Consequently, suitable salts are alkali metal salts such as lithium potassium or, especially, sodium salts or ammonium salts, mono-, di-, tri- or tetraC$_1$-C$_4$alkyl ammonium salts or C$_2$-C$_4$hydroxyalkyl ammonium salts or mixtures thereof.

Similarly, in the case of the cationic dyes, the counter ion should be such as to ensure sufficient water solubility. Preferred salts in this case are, for example, halogenides, especially chlorides, sulphates, methosulphates and, in particular lower aliphatic carboxylates such as formates, acetates and lactates.

The formulation of the invention is suitable for dyeing natural or synthetic materials, in particular cellulosic materials in any desirable shade. In particular, the formulations are suitable for dyeing paper and paperboard.

Consequently, in a further aspect, the invention relates to the use of the solutions for the dyeing of paper, by treating the paper with a liquid composition as defined previously. The liquid preparation is used, optionally after dilution with water, for the dyeing of paper or paperboard, whereby these materials can be dyed, for example, in the pulp, by brushing or immersion or by applying to the paper surface by coating or spraying or for application in a continuous dyeing process, whereby the paper or paperboard which has been dyed with the liquid composition of the invention constitutes a still further aspect of the invention.

The following examples serve to illustrate the invention, without intending to be restrictive in nature. Parts and percentages are by weight unless otherwise stated.

EXAMPLE 1

A mixture consisting of 100 parts of ε-caprolactam, 30 parts of 1-phenoxy-2-propanol, 18 parts of formic acid and 270 parts of water are stirred and heated to 40° C. 600 parts of a moist filter cake, which was previously precipitated at pH 9.0 and washed free of inorganic salts, containing 37.5% of the dye C.I. Basic Blue 100 of the formula $$CuPC\{[SO_2NH(CH_3)_2]_{2-3}SO_3H\}_{1-2} \qquad (101),$$

in which PC represents phthalocyanine, are then added. After stirring for 2 hours at 60° C., the mixture is cooled and filtered to yield a solution containing 22.5% of the dye of formula (101), 10% of ε-caprolactam, 1.8% formic add and 3% 1-phenoxy-2-propanol.

The solution exhibits dynamic viscosity of 300 mPas at 5° C., is readily dilutable with water and is stable to storage at temperatures of between −10 and 50° C. over a period in excess of 6 months.

Similarly stable formulations are obtained by employing varying amounts of 1-phenoxy-2-propanol within the range of from 1 to 5%, whereby the dynamic viscosity of the resulting solutions lies within the range of from 1500 to 200 mPas, depending on the amount of alcohol used.

Additionally, similarly stable formulations are obtained containing between 1 and 5%, instead of 1.8%, formic acid, whereby the pH of the solutions varies between 3 and 6, depending upon the quantity of acid added.

Stable formulations are also obtained from salt-containing filter cakes of the dye, whereby the viscosity of the solutions increases slightly.

COMPARATIVE EXAMPLES 2-6

By proceeding as described in Example 1, but replacing the 30 parts of 1-phenoxy-2-propanol by 30 parts of the additives shown in Table 1, solutions are obtained, the dynamic viscosities of which are measured and the results summarized in the following Table 1 below:

TABLE 1

| Example No. | Additive | Dynamic Viscosity at 5° C. |
|---|---|---|
| 2 | Dipropylene glycol monobutyl ether | 4000 mPas |
| 3 | Tripropylene glycol monobutyl ether | 4200 mPas |
| 4 | 1-Butoxy-2-propanol | 2800 mPas |
| 5 | Benzyl alcohol | 600 mPas |
| 6 | Urea | Highly viscous |

As is apparent from the above results, the viscosities of these solutions are substantially higher than that of the solution of Example 1.

EXAMPLE 7

A salt free concentrate of the dye C.I. Direct Orange 102:1 of the formula

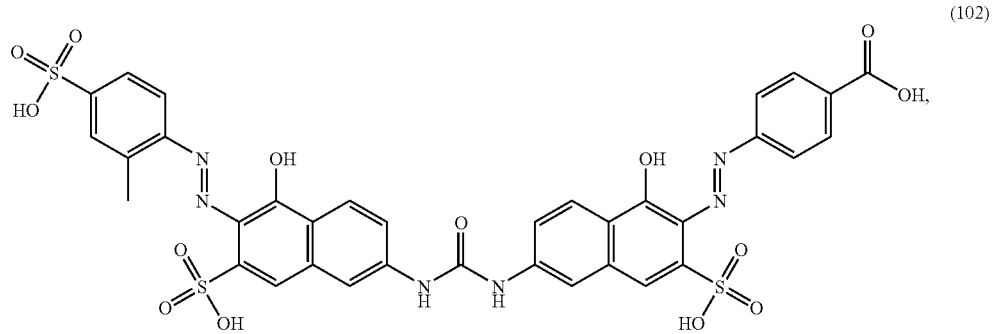

obtained directly from the synthesis and subjected to diafiltration is treated with 1-phenoxy-2-propanol and diluted with water to yield a solution containing 1% 1-phenoxy-2-propanol and 14% of the compound of formula (102).

The resulting solution exhibits a dynamic viscosity of 50 mPas at 25° C. and shows no sedimentation whatsoever upon storage at temperatures of between −10 and 50° C. over a period in excess of 6 months.

COMPARATIVE EXAMPLES 8-18

By proceeding as described in Example 7, but replacing the 1-phenoxy-2-propanol by the same quantities of the additives shown in Table 2, solutions are obtained, the dynamic viscosities of which are measured and the results summarized in the following Table 2 below:

TABLE 2

| Example No. | Additive | Dynamic Viscosity at 25° C. |
| --- | --- | --- |
| 8 | Diethylene glycol monobutyl ether | 75 mPas |
| 9 | 1-Methoxy-2-propanol | 140 mPas |
| 10 | 1-Methoxy-2-propyl acetate | 127 mPas |
| 11 | 1-Ethoxy-2-propanol | 110 mPas |
| 12 | 1-Ethoxy-2-propyl acetate | 99 mPas |
| 13 | 1-Butoxy-2-propanol | 94 mPas |
| 14 | Dipropylene glycol monobutyl ether | 105 mPas |
| 15 | Tripropylene glycol monobutyl ether | 90 mPas |
| 16 | γ-Butyrolactone | 135 mPas |
| 17 | Urea | >100 mPas |
| 18 | Benzyl alcohol | 65 mPas |

As is apparent from the above results, the viscosities of these solutions are substantially higher than that of the solution of Example 7.

The invention claimed is:

1. An aqueous dye solution comprising:
   a) 10 to 25% by weight of an anionic or cationic direct dye,
   b) 0.1 to 5% by weight of 1-phenoxy-2-propanol,
   c) 0 to 20% by weight of an inorganic or an organic acid,
   d) 0 to 20% by weight of further additives and
   e) water to complete to 100%.

2. The aqueous dye solution according to claim 1, wherein the anionic direct dye contains at least one sulfonic acid and/or carboxylic acid group and is derived from a metal-free or metallic monoazo, disazo, or polyazo dye, a pyrazolone dye, a thioxanthone dye, an oxazine dye, a stilbene dye, a formazan dye, an anthraquinone dye, a nitro dye, a methane dye, a triphenylmethane dye, a xanthone dye, a naphthazarine dye, a styryl dye, an azastyryl dye, a naphthoperinone dye, a quinophthalone dye, or a phthalocyanine dye.

3. The aqueous dye solution according to claim 1, wherein the cationic direct dye is a basic dye selected from the group consisting of acridine basic dyes, anthraquinone basic dyes, azine basic dyes, azomethine basic dyes, azostyryl basic dyes, mono-, bis- and polyazo basic dyes, benzimidazole basic dyes, benzothiazole basic dyes, cyanine basic dyes, di- and triarylmethane basic dyes, ketone imine basic dyes, methane and polymethine basic dyes, naphthostyryl basic dyes, nitro basic dyes, oxazine and dioxazine basic dyes, phthalocyanine basic dyes, quinoline basic dyes, quinophthalone basic dyes, thiazine basic dyes, thiazole basic dyes, and xanthene derived basic dyes.

4. A process for preparing an aqueous dye solution according to claim 1, said process comprising stirring an anionic or cationic direct dye with a mixture of water, 1-phenoxy-2-propanol, 0 to 20% by weight of an inorganic or an organic acid, and 0 to 20% by weight of further additives.

5. A method of dyeing paper, paperboard, or pulp, said method comprising applying the aqueous dye solution according to claim 1 to said paper, paperboard, or pulp.

6. A paper dyed with an aqueous dye solution according to claim 1.

7. The aqueous dye solution according to claim 1, wherein said aqueous dye solution is essentially free of alcohol solvents other than 1-phenoxy-2-propanol.

8. The aqueous dye solution according to claim 1, wherein the further additives are selected from the group consisting of water-soluble organic solubilizers, hydrotropic agents, viscosity regulators, dispersing agents, microbiocides, and pH adjusting agents.

9. The aqueous dye solution according to claim 8, wherein the water-soluble organic solubilizers are selected from the group consisting of urea, formamide, ε-caprolactam, sugars, carboxycelluloses, dimethylformamide, 1,2-diaminopropane, 2-(4-aminophenyl)-6-methylbenzothiazole 7-sulphonic acid and salts thereof, and polyhydric alcohols.

10. The aqueous dye solution according to claim 2, wherein the anionic direct dye is derived from a monoazo, disazo, polyazo, or phthalocyanine dye.

11. The aqueous dye solution according to claim 3, wherein the cationic direct dye is selected from the group consisting of mono-, bis, and polyazo basic dyes, and phthalocyanine basic dyes.

* * * * *